US011802996B2

United States Patent
Ding et al.

(10) Patent No.: US 11,802,996 B2
(45) Date of Patent: *Oct. 31, 2023

(54) ONE OPTICAL DESIGN PATTERN/METHOD OF A COST EFFECTIVE IR LENS

(71) Applicant: LIGHTPATH TECHNOLOGIES, INC., Orlando, FL (US)

(72) Inventors: Fujian Ding, Monroe, NY (US); Mark Lifshotz, Oradell, NJ (US)

(73) Assignee: LIGHTPATH TECHNOLOGIES, INC., Orlando, FL (US)

( * ) Notice: Subject to any disclaimer, the term of this patent is extended or adjusted under 35 U.S.C. 154(b) by 412 days.

This patent is subject to a terminal disclaimer.

(21) Appl. No.: 16/865,037

(22) Filed: May 1, 2020

(65) Prior Publication Data

US 2021/0080620 A1  Mar. 18, 2021

Related U.S. Application Data

(63) Continuation of application No. 15/712,991, filed on Sep. 22, 2017, now Pat. No. 10,641,928.

(60) Provisional application No. 62/486,383, filed on Apr. 17, 2017, provisional application No. 62/485,821, (Continued)

(51) Int. Cl.
| | |
|---|---|
| *G02B 3/00* | (2006.01) |
| *G02B 13/14* | (2006.01) |
| *G02B 13/16* | (2006.01) |
| *G02B 27/00* | (2006.01) |
| *G02B 27/42* | (2006.01) |
| *G02B 1/00* | (2006.01) |

(Continued)

(52) U.S. Cl.
CPC .............. *G02B 3/0062* (2013.01); *G02B 1/00* (2013.01); *G02B 3/04* (2013.01); *G02B 5/1814* (2013.01); *G02B 5/1876* (2013.01); *G02B 13/14* (2013.01); *G02B 13/16* (2013.01); *G02B 27/0025* (2013.01); *G02B 27/0037* (2013.01); *G02B 27/4216* (2013.01)

(58) Field of Classification Search
CPC .......... G02B 3/0062; G02B 3/04; G02B 1/00; G02B 5/1876; G02B 5/18; G02B 5/1814; G02B 5/189; G02B 13/14; G02B 13/16; G02B 13/146; G02B 27/0025; G02B 27/0037; G02B 27/4216; G02B 27/005; G02B 27/0056; G02B 27/42; G02B 27/4205; G02B 27/4211; G02B 2005/1804

See application file for complete search history.

(56) References Cited

U.S. PATENT DOCUMENTS

| | | | | |
|---|---|---|---|---|
| 5,973,827 A | * | 10/1999 | Chipper ............. | G02B 27/4272 |
| | | | | 359/356 |
| 9,891,414 B2 | * | 2/2018 | Huddleston .......... | G02B 13/003 |
| 10,641,928 B2 | * | 5/2020 | Ding ..................... | G02B 13/14 |

(Continued)

*Primary Examiner* — Stephone B Allen
*Assistant Examiner* — Adam W Booher
(74) *Attorney, Agent, or Firm* — XSENSUS LLP

(57) ABSTRACT

A lens system for infrared (IR) imaging, including a molded first lens element and an aberration correction second lens element. The first lens element is made of chalcogenide glass and has a first and second surface, one of the first and second surfaces of the first lens element being a diffractive surface. The second lens element has a first and second surface, one of the first and second surfaces being a planar surface and neither of the first and second surfaces being a diffractive surface. The second lens element is of a different material than the second lens element.

20 Claims, 8 Drawing Sheets

Related U.S. Application Data filed on Apr. 14, 2017, provisional application No. 62/398,707, filed on Sep. 23, 2016.

(51) Int. Cl.
    *G02B 5/18*    (2006.01)
    *G02B 3/04*    (2006.01)

(56) References Cited

U.S. PATENT DOCUMENTS

2013/0278999 A1\* 10/2013 Carlie ................. C03C 4/10
    359/356
2019/0293898 A1\* 9/2019 Hasegawa ............ H04N 5/225

\* cited by examiner

ONE OPTICAL DESIGN PATTERN/METHOD OF A COST EFFECTIVE IR LENS

INCORPORATION BY REFERENCE

This application claims the priority benefit of U.S. Provisional Patent Application No. 62/398,707 filed on Sep. 23, 2016 entitled "ONE OPTICAL DESIGN PATTERN/METHOD OF A COST EFFECTIVE IR LENS;" U.S. Provisional Patent Application No. 62/485,821 filed on Apr. 14, 2017 entitled "ONE OPTICAL DESIGN PATTERN/METHOD OF A COST EFFECTIVE IR LENS;" and U.S. Provisional Patent Application No. 62/486,383 filed on Apr. 17, 2017 entitled "OPTICAL DESIGN AND METHOD OF MANUFACTURING COST EFFECTIVE IR LENS." Each of the above-identified provisional application is incorporated by reference herein in its entirety.

BACKGROUND OF THE INVENTION

Field of the Invention

The implementations described herein are directed to a novel and improved design pattern/method of a cost effective lens in any partial band of the wavelength range from 1 to 14 micron, this covers SWIR (short wave IR), MWIR (middle wave IR), and LWIR (long wave IR) bands for the IR imaging and/or spectral applications.

Description of the Related Art

In actual lens design, the molded lenses of chalcogenide glasses are used for some thermal imaging/spectral applications for reducing the cost of the lenses. Molded optical elements of chalcogenide glasses are used to control the unit cost in these kinds of applications for the volume production.

However, current designs of IR fixed focal length imaging lenses with one molded optical element of chalcogenide glasses require at least the second optical lens that is a normal lens with normal manufacturing without a further cost control consideration.

SUMMARY OF THE INVENTION

Various examples described herein are directed to novel and improved optical design pattern/method for the cost effective IR lenses for the bands of either SWIR, or MWIR, or LWIR for imaging and/or spectral applications. This method can be used in IR imaging in SWIR band from 1 to 3 micron or a partial band of it, or in the MWIR band from 3 to 5 micron or a partial band of it, or in the LWIR band from 8 to 12 micron or a partial band of it, or any partial band among 1 to 14 micron such as (but not be limited to) 2 to 5 micron. This design pattern/method can also be used in IR spectral application of any partial band of the wavelength range from 1 to 14 micron.

In this design pattern/method, an optical element is a molded lens and this molded optical element has an optical power that is almost the same as the optical power of the whole lens. In this design pattern/method, an optical element is an aberration correction lens with a very small optical power and this optical element needs a very small manufacturing.

In this design pattern/method, the molded lens can be the first optical element while the aberration correction optical element is the second optical element. In this design pattern/method, the molded lens can be the second optical element while the aberration correction lens is the first optical element.

In this design pattern/method, the molded lens may be (but not be limited to) one kind of chalcogenide glass. In this design pattern/method, the aberration correction lens may be (but not be limited to) Germanium, or Silicon, or ZnSe, or ZnS, or GaAs.

In this design pattern/method, the molded optical element typically comprises (but not limited to) a spherical surface and an aspheric+diffractive surface or a spherical surface and an aspheric surface. It also can be (but not limited to) two spherical surfaces, or two aspheric surfaces, or an aspheric surface and an aspheric+diffractive surface.

In this design pattern/method, the aberration correction lens typically is (but not limited to) with an aspheric surface and a planar surface. It also may have an aspheric+diffractive surface and a planar surface.

Example 1

An optical design pattern/method of IR lens with a molded lens as the second optical lens and an aberration correction lens as the first optical lens.

Example 2

An optical design pattern/method of IR lens with a molded lens as the first optical lens and an aberration correction lens as the second optical lens.

Example 3

The optical design pattern/method of Examples 1 and 2 wherein said IR comprises any partial bands among 1 to 14 micron, such as (but not limited to) SWIR, MWIR, and LWIR.

Example 4

The optical design pattern/method of Examples 1 and 2 wherein said the molded lens comprises (but not limited to) chalcogenide glasses.

Example 5

The optical design pattern/method of Examples 1 and 2 wherein said the aberration correction lens comprises any IR materials, such as (but not limited to) Germanium, ZnSe, ZnS, Silicon, GaAs, Chalcogenide glasses, CdTe, KBr, CaF2, BaF2, MgF2, and SiO2.

Example 6

The optical design pattern/method of Examples 1 and 2 wherein said the molded lens comprises any shapes including but not limited to:
  a. A concave spherical surface and a convex aspheric surface, or
  b. A concave spherical surface and a convex aspheric+diffractive surface, or
  c. A convex spherical surface and a concave aspheric surface, or
  d. A convex spherical surface and a concave aspheric+diffractive surface, or
  e. A convex spherical surface and a concave spherical surface, or f. A convex aspheric surface and a concave aspheric surface, or
g. A convex aspheric+diffractive surface and a concave aspheric+diffractive surface.
h. A convex spherical surface and a convex aspheric surface, or
i. A convex spherical surface and a convex aspheric+diffractive surface, or
j. A convex aspheric surface and a convex aspheric surface, or
k. A convex aspheric surface and a convex aspheric+diffractive surface, or
l. A planar surface and a convex aspheric surface, or
m. A planar surface and a convex aspheric+diffractive surface.

Example 7

The optical design pattern/method of Examples 1 and 2 wherein said the aberration correction lens comprises any shape, such as (but not limited to):
a. The left surface is a planar surface and the right surface is an aspheric surface, or
b. The left surface is a planar surface and the right surface is an aspheric+diffractive surface, or
c. The right surface is a planar surface and the left surface is an aspheric surface, or
d. The right surface is a planar surface and the left surface is an aspheric+diffractive surface.

This application claims the priority benefit of U.S. Provisional Patent Application No. 62/485,821 filed on Apr. 14, 2017, entitled, "One Optical Design Pattern/Method of a Cost Effective IR Lens", which is incorporated herein by reference in its entirety. For example, this application specifically incorporates by reference herein claims 1-44 of U.S. Provisional Patent Application No. 62/485,821 filed on Apr. 14, 2017, entitled, "One Optical Design Pattern/Method of a Cost Effective IR Lens" as well as the discussions elsewhere in the application of these features. All other portions of U.S. Provisional Patent Application No. 62/485,821 filed Apr. 14, 2017 are also specifically incorporated herein by reference in its entirety.

This application also claims the priority benefit of U.S. Provisional Patent Application No. 62/486,383 filed on Apr. 17, 2017, entitled, "Optical Design and Method of Manufacturing Cost Effective IR Lens", which is incorporated herein by reference in its entirety. For example, this application specifically incorporates by reference herein Examples 1-184 of U.S. Provisional Patent Application No. 62/486,383 filed on Apr. 17, 2017, entitled, "Optical Design and Method of Manufacturing Cost Effective IR Lens" as well as the discussions elsewhere in the application of these features. All other portions of U.S. Provisional Patent Application No. 62/486,383 filed Apr. 17, 2017 are also specifically incorporated herein by reference in its entirety.

BRIEF DESCRIPTION OF THE DRAWINGS

The following figures are intended only to further illustrate the invention and are not intended to limit the scope of the invention which is defined by the claims.

DETAILED DESCRIPTION OF THE PREFERRED EMBODIMENT

The embodiments described herein can be implemented by integrating a cost effective molded lens and a cost effective aberration correction lens.

The molded lens is a molded chalcogenide glass lens that has an optical power that is almost same as the optical power of the whole lens assembly.

The aberration correction lens is a low-cost lens that is primarily for the consideration of the aberration correction of the molded lens. This lens has a small manufacturing requirement to control its cost.

The following examples are intended only to further illustrate the invention and are not intended to limit the scope of the invention which is defined by the claims.

Figure 1:
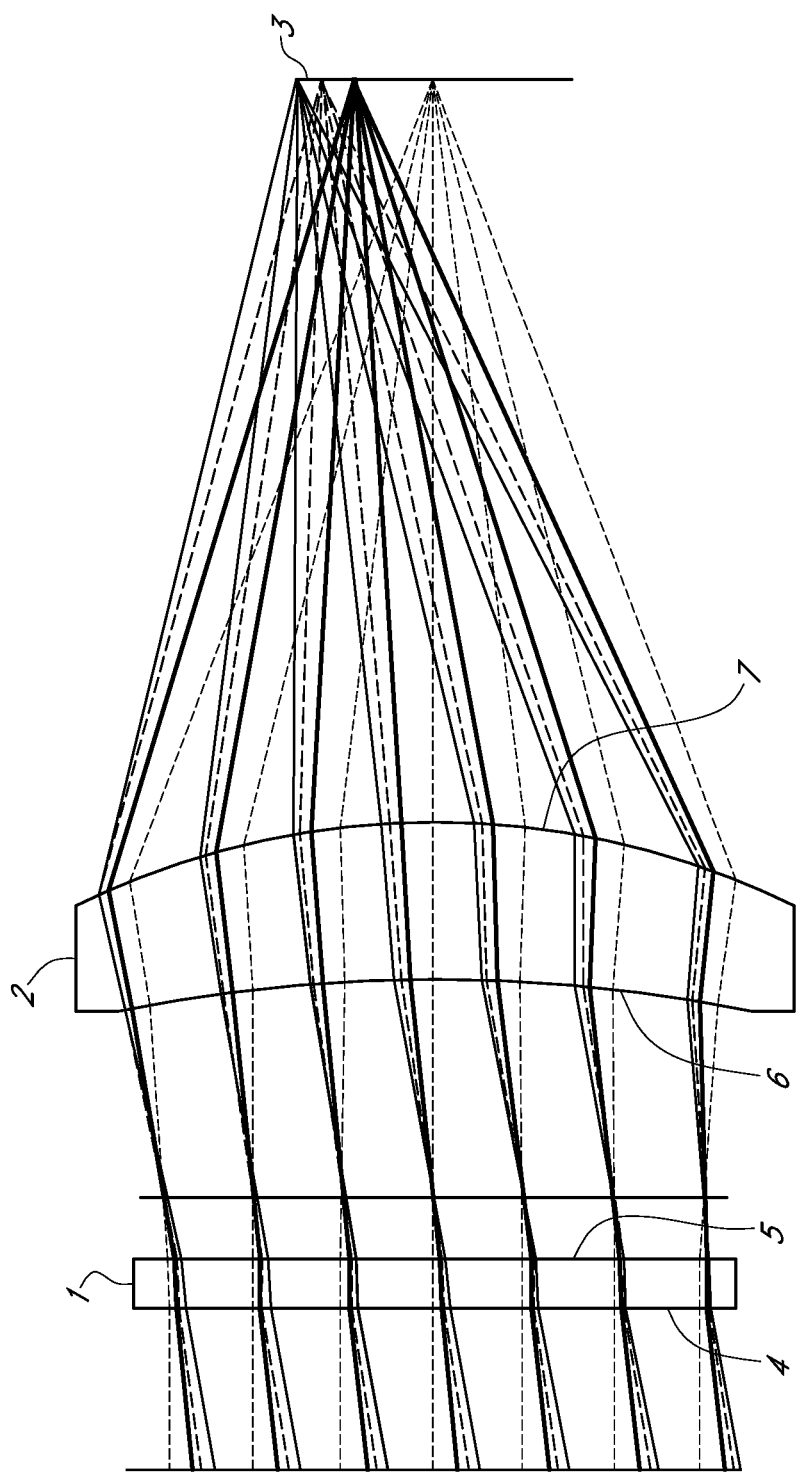
FIG. 1 is one kind of optical configuration of this kind of optical design pattern/method with a front aberration correction lens and a back molded lens with one aspheric+diffractive surface.

Referring to FIG. 1, the front aberration correction lens has an aspheric surface and a planar surface. Here, 1 is the front element, 2 is the back element, 3 is the FPA (Focal Plane Array), 4 is the front surface of the front element, 5 is the back surface of the front element, 6 is the front surface of the back element, and 7 is the back surface of the back element. In this optical configuration, surface 4 is an aspheric surface, surface 5 is a planar surface, surface 6 is a spherical surface, and surface 7 is an aspheric+diffractive surface.

Figure 2:
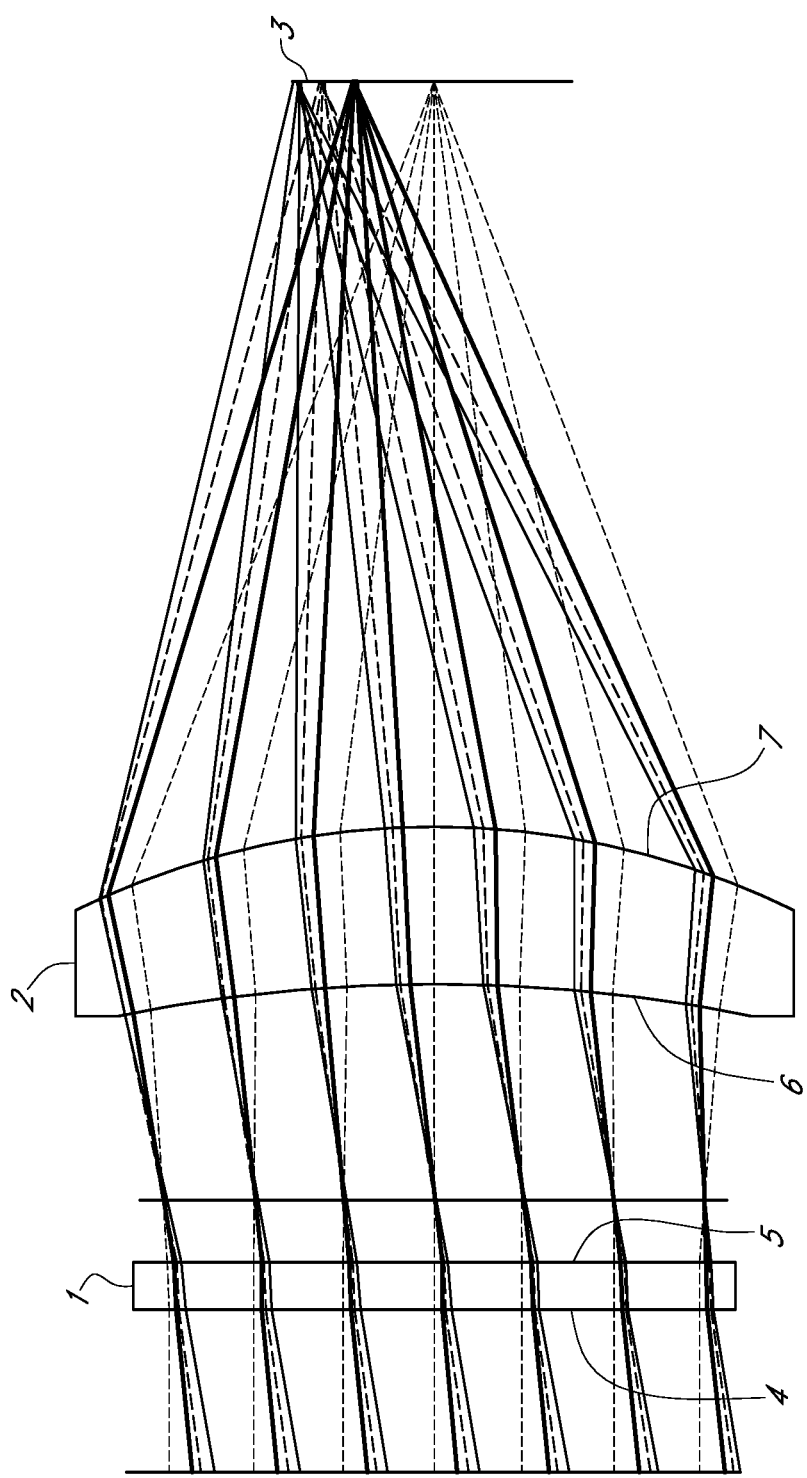
FIG. 2 is one kind of optical configuration of this kind of optical design pattern/method with a front aberration correction lens and a back molded lens with one aspheric+diffractive surface.

Referring to FIG. 2, the front aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is a planar surface, surface 5 is an aspheric surface, surface 6 is a spherical surface, and surface 7 is an aspheric+diffractive surface.

Figure 3:
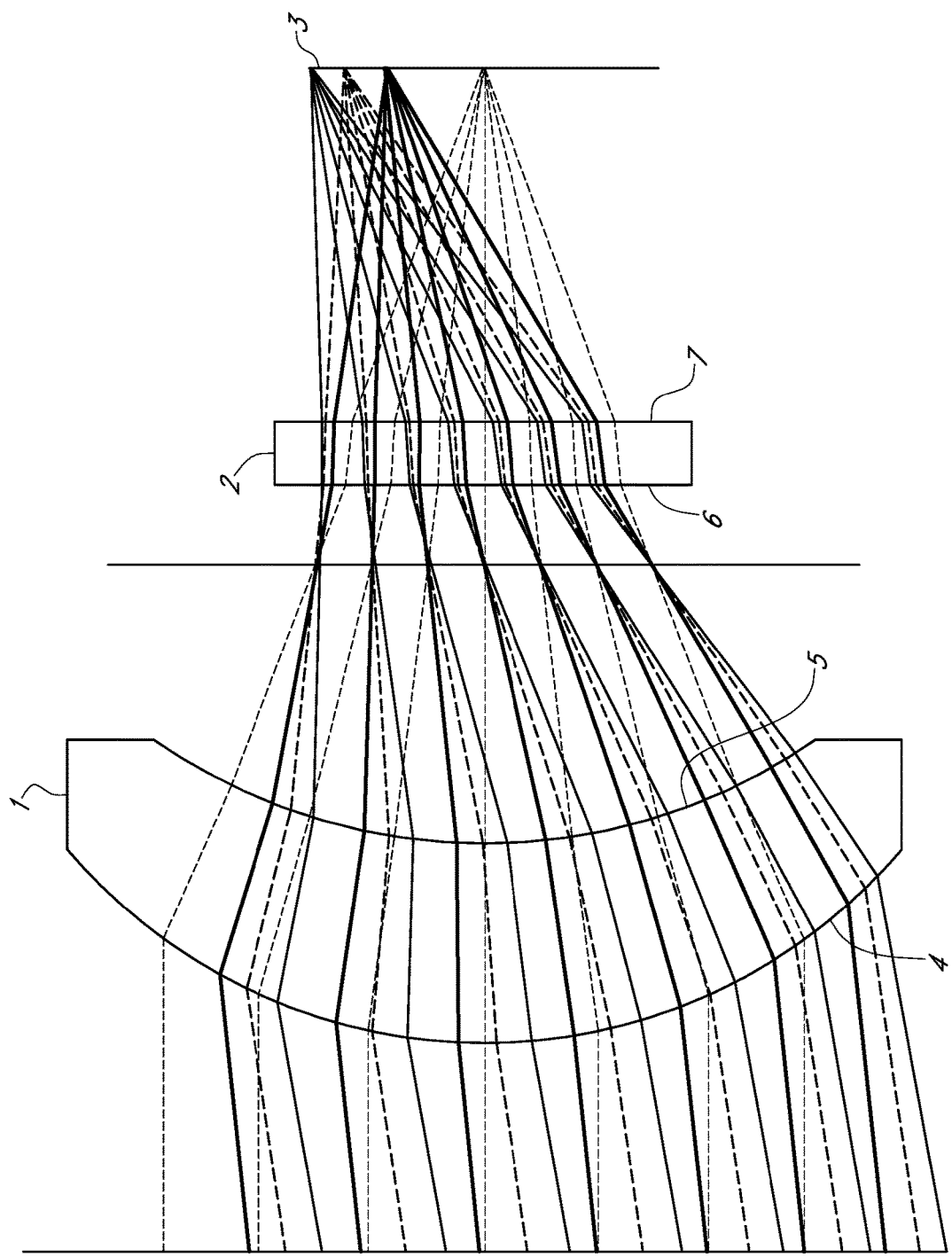
FIG. 3 is one kind of optical configuration of this kind of optical design pattern/method with a back aberration correction lens and a front molded lens with one aspheric+diffractive surface.

Referring to FIG. 3, the back aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is an aspheric+diffractive surface, surface 5 is a spherical surface, surface 6 is a planar surface, and surface 7 is an aspheric surface.

Figure 4:
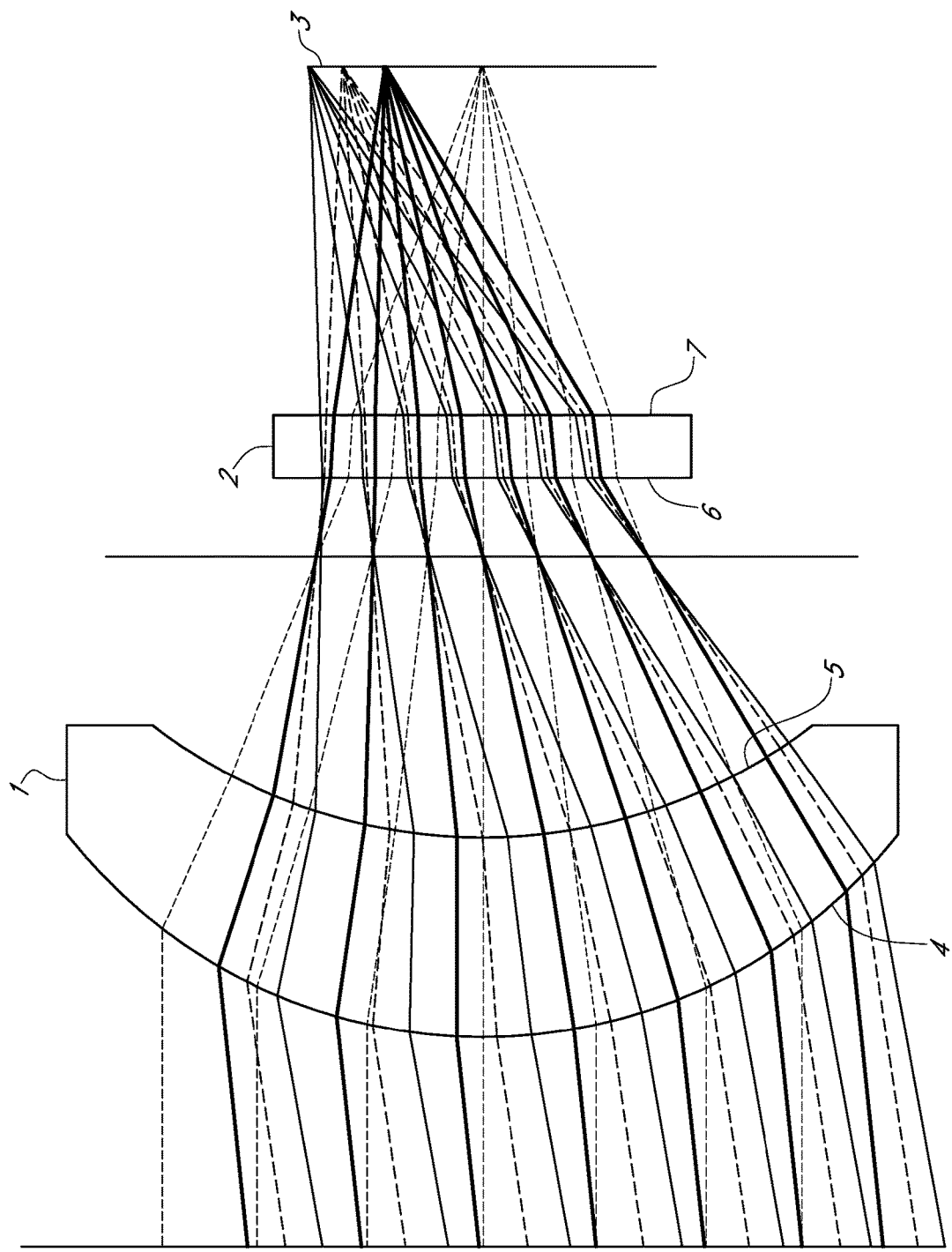
FIG. 4 is one kind of optical configuration of this kind of optical design pattern/method with a back aberration correction lens and a front molded lens with one aspheric+diffractive surface.

Referring to FIG. 4, the back aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is an aspheric+diffractive surface, surface 5 is a spherical surface, surface 6 is an aspheric surface, and surface 7 is a planar surface.

Figure 5:
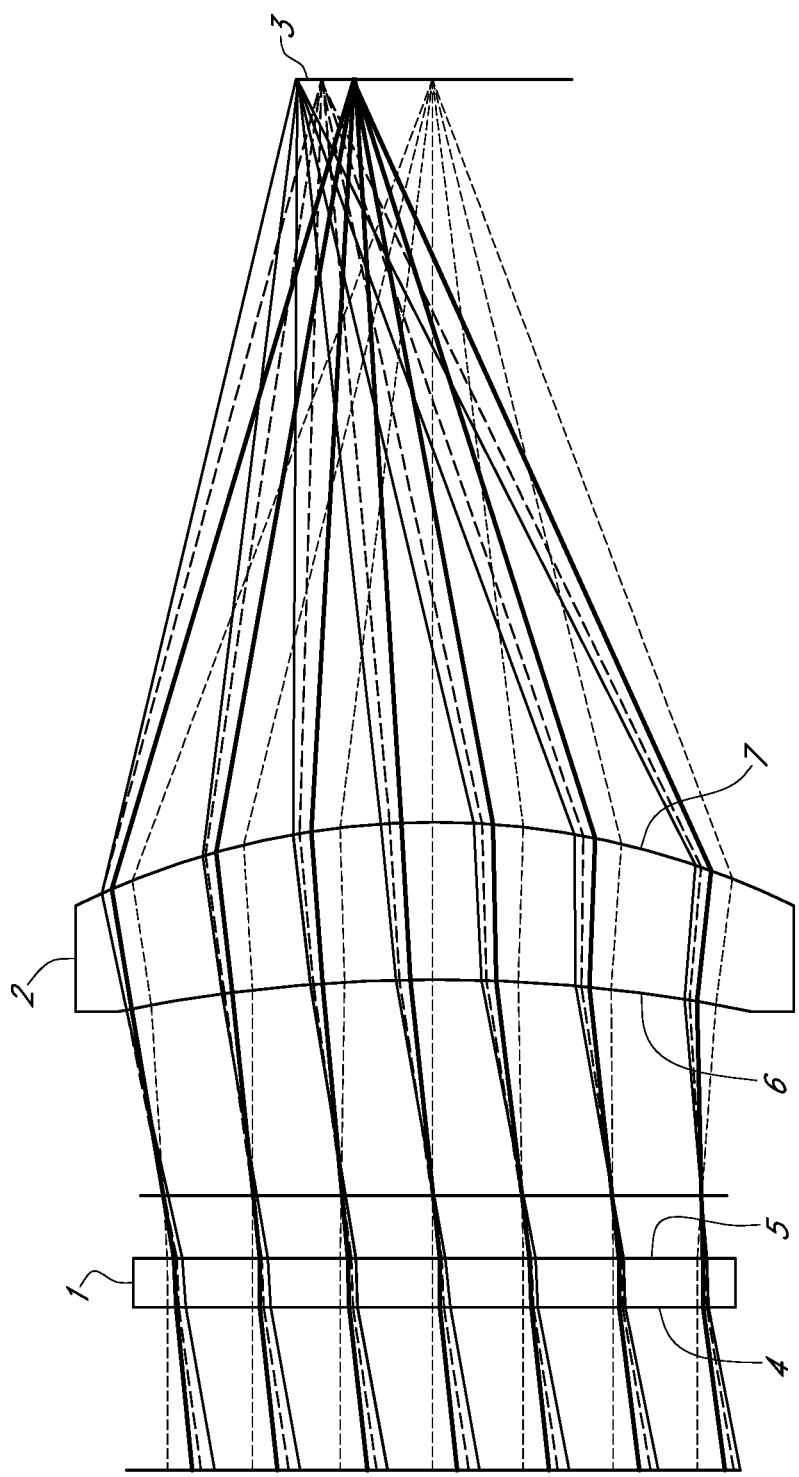
FIG. 5 is one kind of optical configuration of this kind of optical design pattern/method with a front aberration correction lens and a back molded lens with one aspheric+diffractive surface.

Referring to FIG. 5, the front aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is an aspheric surface, surface 5 is a planar surface, surface 6 is an aspheric+diffractive surface, and surface 7 is a spherical surface.

Figure 6:
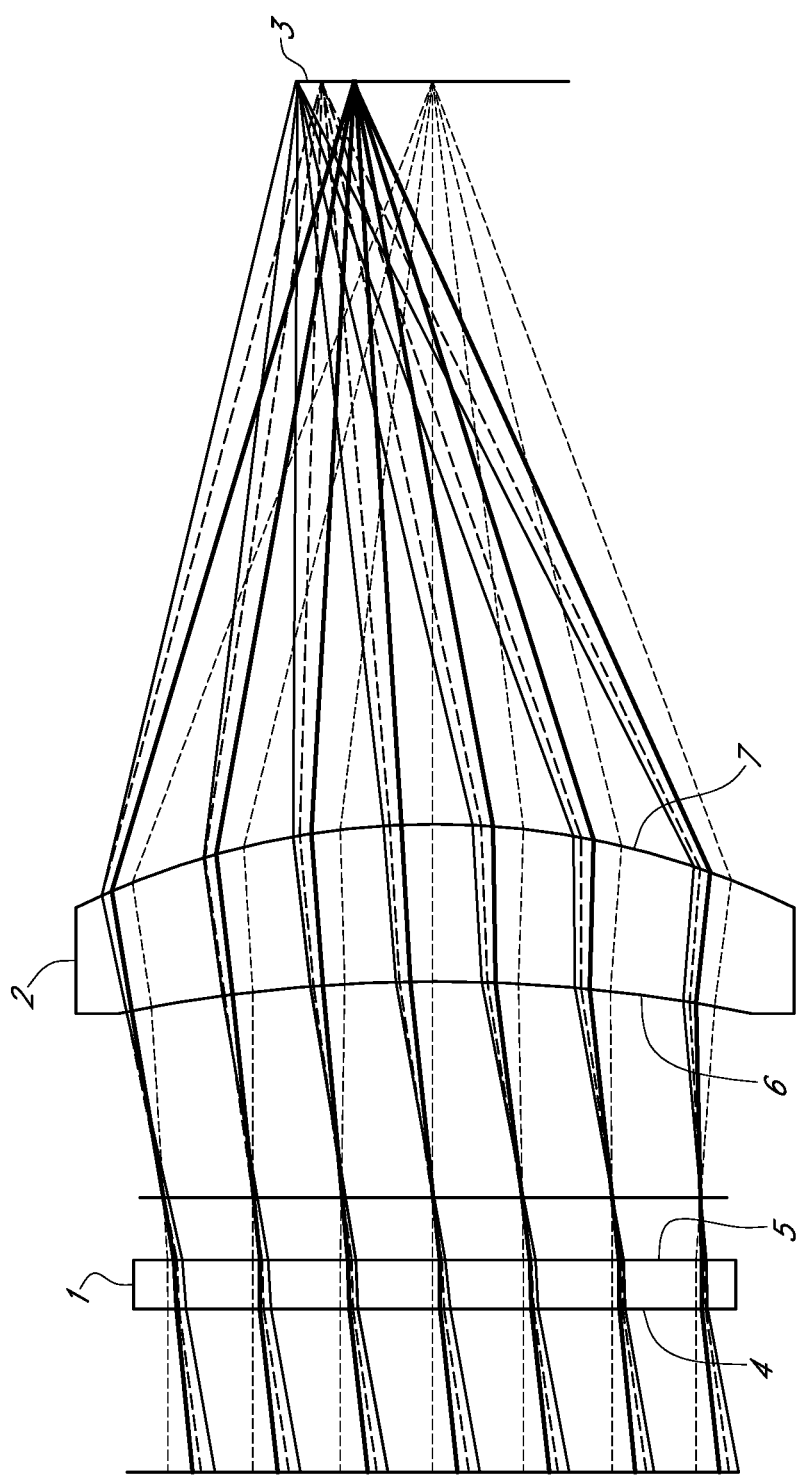
FIG. 6 is one kind of optical configuration of this kind of optical design pattern/method with a front aberration correction lens and a back molded lens with one aspheric+diffractive surface.

Referring to FIG. 6, the front aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is a planar surface, surface 5 is an aspheric surface, surface 6 is an aspheric+diffractive surface, and surface 7 is a spherical surface.

Figure 7:
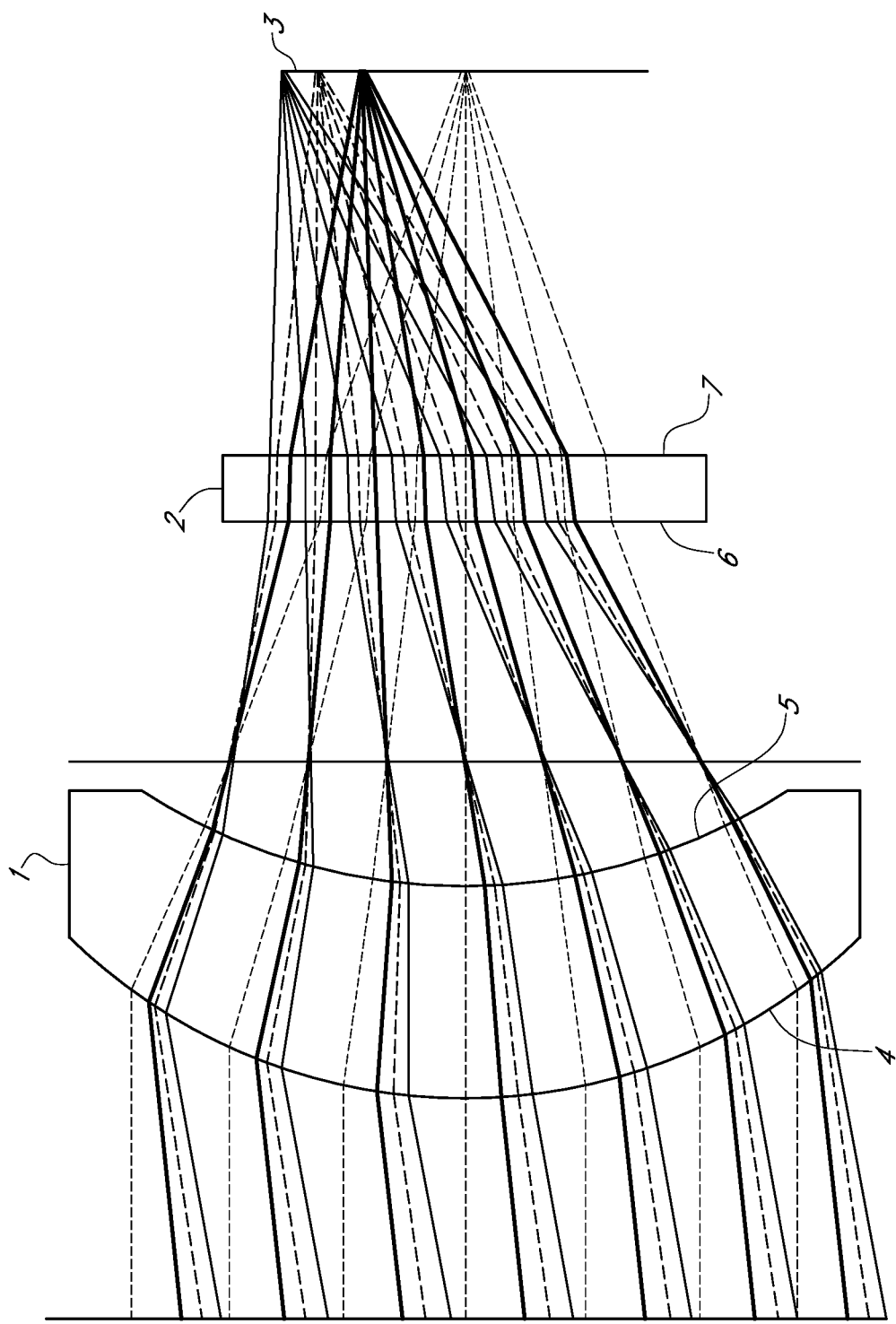
FIG. 7 is one kind of optical configuration of this kind of optical design pattern/method with a back aberration correction lens and a front molded lens with one aspheric+diffractive surface.

Referring to FIG. 7, the back aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 is a spherical surface, surface 5 is an aspherical+diffractive surface, surface 6 is a planar surface, and surface 7 is an aspheric surface.

Figure 8:
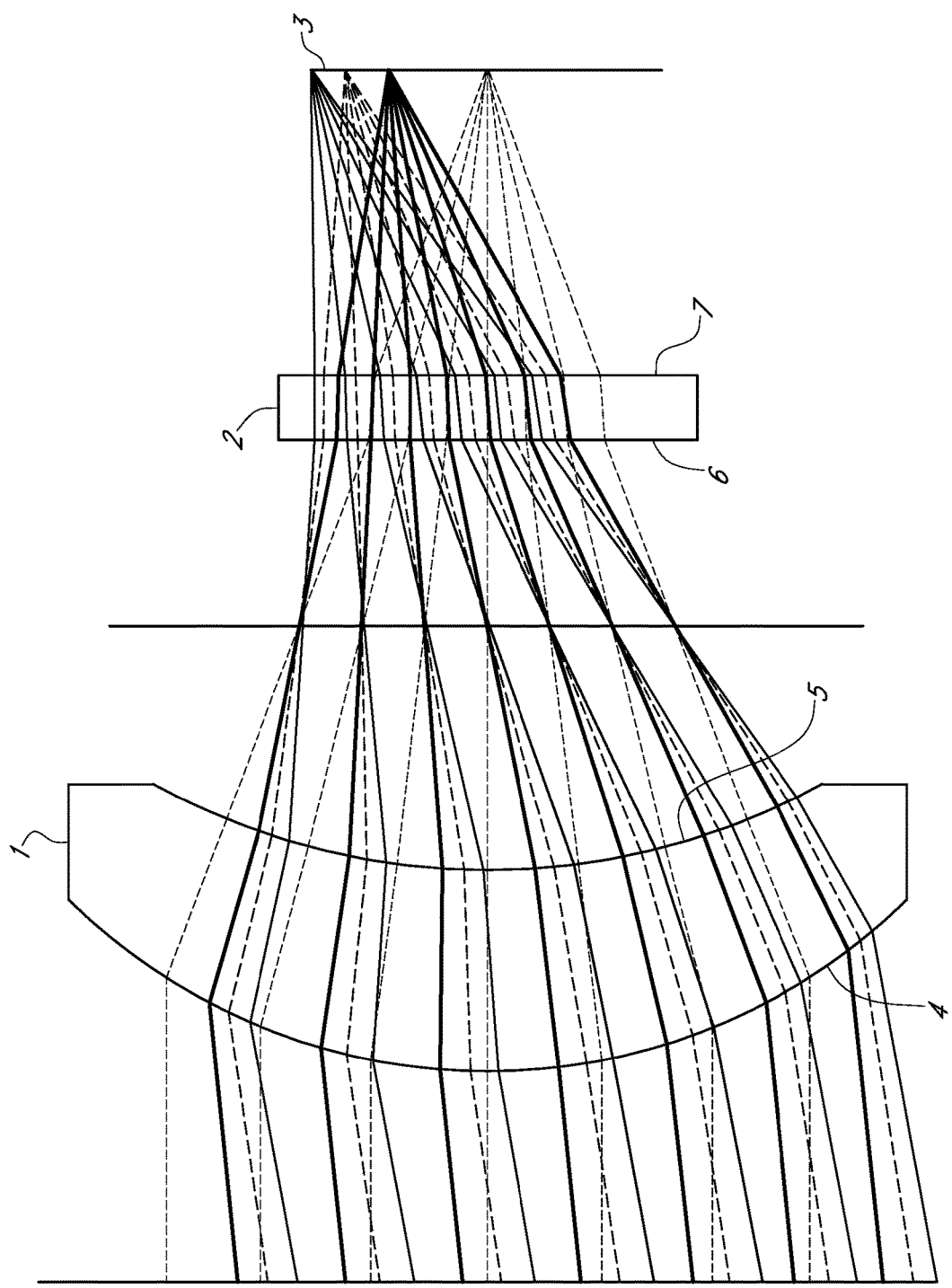
FIG. 8 is one kind of optical configuration of this kind of optical design pattern/method with a back aberration correction lens and a front molded lens with one aspheric+diffractive surface.

Referring to FIG. 8, the back aberration correction lens has an aspheric surface and a planar surface. Here, 1 is the front element, 2 is the back element, 3 is the FPA, 4 is the front surface of the front element, 5 is the back surface of the front element, 6 is the front surface of the back element, and 7 is the back surface of the back element. In this optical configuration, surface 4 a spherical surface, surface 5 is an aspheric+diffractive surface, surface 6 is an aspheric surface, and surface 7 is a planar surface.

Example 1

A lens sample was shown here. This lens is an optically a-thermalized lens for the wavelength range from 8-12 micron. The focal length, F#, and the angular FOV (Field of View) of it are 22.5 mm, 1.4, and 22.6°, respectively.

1. The first optical element is an aberration correction lens with the following features/specifications/parameters.
   a. The material of it is Germanium.
   b. The first surface is an aspheric surface with maximum sag of 23 micron.
   c. The second surface is a planar surface.
2. The second optical element is a molded lens with the following features/specifications/parameters.
   a. The material of it is one kind of chalcogenide glass, $As_{40}Se_{60}$.
   b. The first surface is a concave spherical surface.
   c. The second surface is a convex aspheric+diffractive surface.

Both the molded lens and the aberration correction are cost-effective. The total cost including the material and the manufacturing is significantly lower than the conventional lenses of the same optical performance and specifications for volume production.

What is claimed is:

1. A lens system for infrared (IR) imaging, comprising:
   a molded first lens element comprising chalcogenide glass and having a first and second surface, one of the first and second surfaces of the first lens element being a diffractive surface, and
   an aberration correction second lens element having a first and second surface, one of the first and second surfaces being a planar surface and neither of the first and second surfaces being a diffractive surface, the second lens element comprising a material selected from the group consisting of Germanium, Silicon, ZnSe, ZnS, CdTe, KBr, CaF2, BaF2, MgF2, SiO2, and GaAs, and the optical power of the first lens element being greater than the optical power of the second lens element, wherein the aberration correction second lens element corrects for aberration in light output by the molded first lens element.

2. The lens system of claim 1, wherein the second lens element comprises Germanium.

3. The lens system of claim 1, wherein the second lens element comprises Silicon.

4. The lens system of claim 1 wherein the second lens element comprises a material selected from the group consisting of ZnSe and ZnS.

5. The lens system of claim 1, wherein the second lens element comprises a material selected from the group consisting of CdTe, KBr, CaF2, BaF2, and MgF2.

6. The lens system of claim 1, wherein the second lens element comprises SiO2.

7. The lens system of claim 1, wherein the second lens element comprises GaAs.

8. The lens system of claim 1, wherein the optical power of the first lens element is almost the same as the optical power of the lens system.

9. The lens system of claim 1, wherein one of the first and second surfaces of the first lens element comprises a concave surface and the other of the first and second surfaces of the first lens element comprises a convex surface.

10. The lens system of claim 9, wherein the first surface of the first lens element is an aspherical diffractive surface.

11. The lens system of claim 9, wherein the second surface of the first lens element is an aspherical diffractive surface.

12. The lens system of claim 9, wherein the first surface of the first lens element is a spherical surface.

13. The lens system of claim 9, wherein the second surface of the first lens element is a spherical surface.

14. The lens system of claim 1, further comprising a focal plane array (FPA), wherein the second lens element is between the first lens element and FPA, the lens system configured to direct light incident on the FPA in a wavelength range between 1 to 14 microns.

15. The lens system of claim 1, further comprising a focal plane array (FPA), wherein the first lens element is between the second lens element and FPA, the lens system configured to direct light incident on the FPA in a wavelength range between 1 to 14 microns.

16. The lens system of claim 1, wherein the second lens element comprises an aspherical surface with a maximum sag of 23 microns.

17. The lens system of claim 16, wherein the first and second lens elements are configured to direct light in a wavelength range of 8-12 microns.

18. The lens system of claim 16, wherein the second lens element comprises Germanium.

19. The lens system of claim 16, wherein the first lens element comprises a concave spherical surface.

20. The lens system of claim 19, wherein the first lens element comprises a convex aspherical and a diffractive on the second surface.

\* \* \* \* \*